US007963426B2

(12) United States Patent
Grüebel et al.

(10) Patent No.: US 7,963,426 B2
(45) Date of Patent: Jun. 21, 2011

(54) RECEPTACLE WHICH CAN BE FIXED TO A HEAD COVERING AND IS INTENDED FOR ATTACHMENTS FOR SIGHTING DEVICES

(75) Inventors: Edwin Grüebel, Widnau (CH); Wolfgang J. Müeller, Lustenau (AT); Markus Lichtensteiger, Montlingen (CH); Manfred Vith, Klaus (AT)

(73) Assignee: Vetronix AG, Heerbrugg (CH)

( * ) Notice: Subject to any disclaimer, the term of this patent is extended or adjusted under 35 U.S.C. 154(b) by 1459 days.

(21) Appl. No.: 11/372,579

(22) Filed: Mar. 10, 2006

(65) Prior Publication Data

US 2007/0212930 A1 Sep. 13, 2007

(51) Int. Cl.
*A42B 1/24* (2006.01)
*A42B 3/00* (2006.01)
*G02B 27/00* (2006.01)

(52) U.S. Cl. ............................ 224/181; 224/930; 2/422

(58) Field of Classification Search .................. 224/181, 224/930; 2/422
See application file for complete search history.

(56) References Cited

U.S. PATENT DOCUMENTS 5,226,181 A * 7/1993 Polednak et al. ................ 2/422
5,416,922 A * 5/1995 Horvat et al. ...................... 2/6.2
5,467,479 A 11/1995 Mattes et al.
5,506,730 A * 4/1996 Morley et al. ................. 359/815
5,683,831 A * 11/1997 Baril et al. ....................... 429/96
7,219,370 B1 * 5/2007 Teetzel et al. ...................... 2/6.2
2002/0189056 A1 * 12/2002 Gallina et al. ................ 24/68 R
2004/0261158 A1 * 12/2004 Depew et al. ...................... 2/422
2008/0263752 A1 * 10/2008 Solinsky et al. .................. 2/422

FOREIGN PATENT DOCUMENTS

WO WO 2006/065805 A2 6/2006

* cited by examiner

*Primary Examiner* — Justin M Larson
*Assistant Examiner* — Adam Waggenspack
(74) *Attorney, Agent, or Firm* — Miller, Canfield, Paddock and Stone; Timothy J. Engling

(57) ABSTRACT

An attachment receptacle (10) which can be fixed on a head covering, such as a helmet 5, of a user and has a clamping device is provided. The attachment receptacle 10 is fixed by means of a fixing component, for example having hook-like retaining brackets 9*a*, 9*b*, on the back of a head covering and is connected via a clamping element to the front or to a sighting device mounted on the front, such as a night vision device 2. The attachment receptacle 10 with the clamping device is formed in such a way that externally accessible components are integrated in the form of the receptacle, in such a way that no projecting or protruding components can cause unintentional actuation of the clamping device. The attachment receptacle 10 is furthermore advantageously formed on the head covering so as to be adjustable in height.

1 Claim, 8 Drawing Sheets

RECEPTACLE WHICH CAN BE FIXED TO A HEAD COVERING AND IS INTENDED FOR ATTACHMENTS FOR SIGHTING DEVICES

The invention relates to a receptacle for attachments for sighting devices according to the preamble of claim 1.

Sighting devices worn on a head covering, such as a helmet, are used in particular by military, police and border protection forces. Such sighting devices are, for example, night vision or thermal imaging devices for use under poor visual or light conditions or in darkness. In order to keep the weight of the sighting devices worn on the head as low as possible, components which may not be provided directly in the sighting device are mounted as separate attachments by means of a receptacle on the helmet and are electrically and optionally also electronically connected to the sighting device—generally by means of a cable. The attachments are, for example, battery units for power supply to the sighting device or switching devices, for example for switching the amplifier power of a light amplifier on and off and for regulating said power.

In order to balance the weight of the sighting device—at least partly—with the weight of the attachments, it is usual to position the attachments on that side of the head covering which is substantially opposite the sighting device. As for the sighting device, firm mounting on the head covering is also required for the attachments in order to avoid yielding in the case of vibrations which occur in particular as a result of movements of the user.

Various receptacles which can be fixed to a head covering and are intended for attachments are known. The fixing is effected, for example, directly, for example by screwing on, on the head covering. A receptacle of this type is described in U.S. Pat. No. 5,683,831. In the case of the receptacle shown there, a receptacle element is screwed on to the helmet. The receptacle element has joins into which rails of a battery housing are pushed, with the result that the battery housing is detachably mounted on the receptacle element. The power to the sighting device is supplied by means of a cable led via the helmet.

A disadvantage of such an arrangement proves to be the fixing of the receptacle element on the helmet. Consequently, the helmet cannot be easily changed—which may be required, for example, in the case of damage—or the receptacle element cannot be easily removed from the helmet—which may be desired for weight reasons, for example in deployments without a sighting device. Moreover, there is a greater danger of entanglement through the loose cable run over the helmet. Furthermore, owing to the fixed cable length, adaptation to different helmet sizes is not possible.

For example, receptacles which are clamped between two sides of the head covering are known as receptacles which can be fixed detachably—without an aid, such as a tool—on a head covering. For this purpose, the receptacle is mounted or fixed on one side of the head covering and clamped on the other side by means of a tension strap led over the head covering, the tension strap being mounted or fixed on the other side. The fixing to the head covering is effected by clamping the tension strap on the head covering by means of a clamping lever. The cable is led under the tension strap.

In this arrangement, however, the problem that the clamping lever is accidentally operated and the connection thus released frequently occurs. For example, the undesired operation takes place as a result of bushes and branches or when the user knocks his head somewhere. The cable, too, constitutes a danger with regard to entanglement if it is not stretched taut under the tension strap and hangs out—for example in the case of a narrow tension strap on a relatively small helmet.

In order to eliminate the disadvantages of the prior art, an object of the present invention is to provide a receptacle for attachments for sighting devices which can be fixed on a head covering and permits a more compact arrangement on the head covering and hence greater stability and greater comfort when worn. A further or alternative object is the provision of a receptacle which can be fixed on a head covering and for which the probability of accidental release of the fastening is reduced. Furthermore or alternatively, it is intended to provide a receptacle which can be used on head coverings of different sizes.

These objects are achieved by a receptacle for attachments in which the characterizing features of claim 1 or of the dependent claims are realized or achieved or the solutions further developed.

According to the invention, an attachment receptacle having a clamping device for fixing the receptacle via a clamping element on a head covering or for producing a retaining connection via the clamping element is formed. Consequently, no further fixing parts are required on the head covering or on the clamping element. As a result of the formation according to the invention the receptacle, after fixing on the head covering, forms an extremely compact arrangement with the sighting device arranged on the opposite side of the head covering. Because both receptacle and clamping device are opposite the sighting device, a greater weight balance and hence also greater comfort when worn are achieved.

Furthermore, the side of the head covering on which the sighting device is arranged is referred to as the first side or front and the side of the receptacle accordingly as second side or back.

The head covering on which the receptacle according to the invention is worn in the position of use is, for example, a helmet. The receptacle can also be used on a face mask, as known, for example, from military applications, or a carrying frame, for example a belt-like one, as head coverings.

The clamping element is, for example, a plastic or a textile tension strap. It may comprise a plurality of parts and/or have different defined regions—for example—of different materials which are preferably not mechanically extensible or only slightly so. In an embodiment of the invention, the clamping element is a two-part tension strap, the first part being in the form of a textile strap and the second part in the form of a plastic strap having a tooth system, and the parts are connected to one another.

For mounting the attachment receptacle according to the invention on the head covering, at least one fixing component, such as a support plate, and the clamping element are provided, the receptacle being capable of being connected, in particular detachably, to the fixing component and the clamping element. Furthermore, receptacle and clamping element are preferably formed in such a way that the clamping element can be pushed into or onto the receptacle, at least along a clamping region or adjusting region, with the result that adaptation of the connection produced via the clamping element to different head covering sizes is permitted. By means of the fixing component, the receptacle is fixed or positioned on the back of the head covering. Via the clamping element, a connection to the front and/or to the sighting device is produced. The fixing component is held on the back and the clamping element on the front of the head covering, for example in each case by means of hook-like retaining brackets. Once the receptacle has been positioned in this way on the head covering, a firm retaining connection is produced via the clamping element by means of the clamping device of the receptacle.

For this purpose, the clamping device has in particular a fixing element—for example having a clip- or clamp-like action—for fixing and optionally tensioning the clamping element so that the clamping element can be firmly held in a position in which the receptacle rests firmly—substantially nondisplaceably—on the head covering. A fixing element having a clip- or clamp-like action can be in the form of conventional clips or clamps so that the clamping element can be firmly held in the fixing position by clipping or clamping. The fixing on the head covering can be further strengthened if the clamping element is clamped under tension and fixed. For removing the receptacle, the fixing element is brought out of the fixing position, the clamping element is moved away and the retaining connection is thus released. With a clamping element displaceable in—or on—the receptacle, the connection can be further released by displacement, for example pulling out, of the clamping element. After the connection has been released the receptacle can be removed from the head covering—optionally in a position connected to the fixing component and/or the clamping element.

If the fixing element is displaceable along a region, the clamping element can be clamped by holding the clamping element by means of the fixing element, for example by clips, clamps or claws, and the fixing element can be displaced by applying a force along the region in such a way that the connection is made narrower. As a result of the displacement, the clamping element is clamped and the receptacle is pressed onto the head covering. In this position, the clamping element is then fixed.

If the clamping device has a fixing element, an adjusting element for the fixing element is preferably also provided. The adjusting element is, for example, a lever-like or cord-like actuating device, such as a clamping lever, of the clamping device for the fixing element, actuation of the fixing element being understood as meaning the bringing thereof into the position for fixing and releasing the clamping element and optionally into an intermediate position for partly releasing the clamping element. In the case of a corresponding formation of the clamping device, rotation, pivoting or pulling of the adjusting element can transmit a force to the fixing element.

If the clamping element has locking elements and the fixing element has snap-in elements for cooperating with the locking elements or snapping into them, the fixing element can engage the locking element and can be moved into the snapped-in position and fixed and the clamping element thus clamped. The locking elements are, for example, a tooth system on the clamping element, openings/holes or loops. The snap-in elements are formed so as to correspond with the locking elements, for example as catch knives, pins or hooks. The clamping element is, for example, strap-like or rope-like and optionally also asymmetrical in form. The clamping element is preferably made of material which is not very extensible, for example of plastic.

Because the clamping device is arranged in or on the receptacle, the arrangement can be such that no components protrude or stick out—that the forms of clamping device or externally accessible parts of the clamping device, such as an actuating device, and receptacle so to speak "fuse together"—for example by means of an actuating device which rests closely against the receptacle or forms a covering of the receptacle or is integrated into a covering of the receptacle. In an embodiment of the invention, the receptacle has a clamping device with a clamping lever as an adjusting element or actuating device, and a housing, the clamping lever in the fixing position resting closely against the housing and additionally being snapped in on the housing. With external forms adapted to one another or fitting into one another in such a way, the receptacle is designed so as to have an extremely stable adjustment with respect to the fixing on the head covering, since an arrangement having a substantially uniform surface affords no possibilities or scarcely any possibilities for engagement from outside, so that misadjustment or release of the receptacle on or from the head covering as a result of entanglement in or pulling off of elements of the receptacle is virtually impossible.

An attachment receptacle according to the invention may have further components, such as, for example, a housing or housing component for holding the attachments. The receptacle can also be formed for mounting of housings of the attachments.

The attachments are integrated or can be integrated in the receptacle and comprise an energy source, such as batteries, for energy supply to the sighting device. The electrical connection to the sighting device is effected in particular by means of a cable led from the receptacle to the sighting device. The attachment may comprise further electrical, electronic and mechanical components. Electronic components can be provided, for example, for processing signals delivered via interfaces. A circuit board having SMD components and chips may represent such an electronic component. The chip can be designed, for example, for converting video signals into signals for a sighting device display. Signals delivered via interfaces, such as plug connections, may also be GPS signals, for example from a pocket computer, or video signals from cameras or thermal imaging devices.

If the sighting device is a night vision device, a control unit for a light amplifier of the night vision device is preferably also provided as an attachment. Optionally, the attachments have components which serve for switching the light amplifier and/or video signal on and off.

If the sighting device is a binocular having measuring and/or recording functions, for example, the power supply of a laser, of a camera or of a computing unit, for example for a telemeter and/or further signals, such as position signals for input into the binocular, can be provided by means of the attachment.

The optionally used cable for connecting the attachments to the sighting devices is formed according to the type and number of attachments. One power cable is sufficient for the power supply. The transmission of a plurality of signals can be effected by means of a flat cable or interface cable. Optionally, a connection of the attachments to a plurality of sighting devices, for example by means of a plurality of cables, can also be provided. According to the invention, the cable can be led in the clamping element, with the result that complete protection from environmental influences and entanglement is achieved. Furthermore according to the invention, for a clamping element displaceable in the receptacle, the cable is led in the receptacle in a loop so that the loop is unrolled on displacement of the clamping element in a first direction, for example for pulling out the clamping element, and the clamping element is rolled up again into the loop on displacement in the opposite direction—pushing in the clamping element. Thus, the cable can be adjusted with the clamping element without ever being unprotected.

As mentioned above, the fixing component for fixing the attachment receptacle on the head covering in the position of use—on the head covering of a user—is connected indirectly or directly, preferably detachably, to the receptacle. In order to fix the receptacle on the head covering, the fixing component is placed firmly against the head covering, for example by means of hooks or alternative positioning elements or even clips. For example the fixing component is in the form of a support plate having hook-like retaining brackets. For connection of receptacle and fixing component, the receptacle and the fixing component can have indirectly or directly corresponding connecting partners, such as hooks and slots or guides and rails, preferably for connection by detachable interlocking means, such as by locking, clicking in, snapping in or insertion or even via a detachable screw connection.

The fixing component may also be—indirectly or directly—part of the receptacle. A direct part of a receptacle could be, for example, a receptacle housing or housing part in the form of a fixing component or simply a support plate formed for the mounting of attachment housings.

In the case of specially designed head coverings, the fixing component may optionally be a part of the head covering—for example a helmet may be formed with hooks or alternative fixing parts as fixing components for mounting—for example locking, clicking in, inserting or connecting via a rotary connection—the receptacle or corresponding parts of the receptacle. With such a fixing component integrated in the head covering, the receptacle is fixed by the connection to the fixing component on the head covering. Of course the connection should be detachable for such an embodiment.

Alternatively, a special head covering may also have connecting parts for mounting the fixing component, such as hooks or alternative connecting parts for mounting—for example for locking, clicking in, inserting or connecting via a rotary connection—the fixing component which is provided in accordance with corresponding parts. The fixing of the receptacle on the head covering is therefore achieved by connecting the fixing component to the head covering via the connecting parts themselves and connecting the receptacle to the fixing component.

The fixing component can optionally be firmly connected to the head covering, for example by means of screws. A firm connection does however constitute a restriction with regard to the removal or replacement of the fixing component or the transfer to another head covering.

An attachment receptacle improved with respect to adaptation to head coverings of different sizes is provided with a receptacle which is connected to a fixing component via a connecting element, connecting element and fixing component being formed so as to be capable of being positioned differently relative to one another. The fixing component is one of the alternatives described above—with the exception of the fixing component as a direct part of the receptacle. The connecting element is preferably a component of the receptacle, such as a retaining plate or the back panel of a housing. Fixing component and connecting element can be positioned relative to one another along an imaginary connecting line which runs from the back through the middle to the front of the head covering—the receptacle is thus adjustable in height on the head covering. A receptacle which is flexible in this manner can be adapted, for example, to helmets of different countries which may differ substantially in their sizes, or to individual needs based on weight distribution. Together with a displaceable clamping element as described above, an even further adaptation range of the attachment receptacle is permitted.

The positionability is achieved by means of positioning elements. The positioning elements may be separate components and capable of being detachably mounted on fixing component and connecting element. They may also be firmly mountable or mounted or in the form of a unit, for example integral with fixing component and connecting element. For example, the fixing component has hook elements and the connecting element has slot elements as positioning elements. If the fixing component is placed—or fixed—on the head covering in the position of use, the hook elements can be clicked into the slot elements at the appropriate height depending on the helmet size. Of course it is possible to use a large number of customary positioning elements by means of which a connection can be produced, in particular by detachable interlocking, for example a snap or locking connection. The connecting element could also be displaceable in a rail of the fixing component and fixable in different positions. In the case of the abovementioned special head coverings having integrated fixing component, the fixing component can form the positioning element (for example a plurality of slots in a helmet or hooks on a helmet). In the case of the special head coverings described above and having connecting parts, the connecting parts may be further positioning elements—positioning of the receptacle relative to the head covering is therefore possible by positioning the fixing component relative to the head covering and by positioning the connecting element relative to the fixing component.

The invention is described in more detail below, purely by way of example, with reference to working examples shown schematically in the drawings. Specifically, FIG. 1 shows a receptacle according to the invention for attachments in the position of use, fixed on the back of the helmet of a user;

FIG. 2 shows the receptacle from FIG. 1 obliquely from below (viewed from the direction of the user);

FIG. *3a* shows a rear view of the receptacle according to the invention comprising a fixing component and a connecting element in a first relative position;

FIG. *3b* shows the view from FIG. *3a* comprising fixing component and connecting element in a second relative position;

FIG. *3c* shows the view from FIG. *3a* comprising fixing component and connecting element in a third relative position;

FIG. *7a* shows a detailed view of the tensioning strap in the receptacle;

FIG. *7b* shows the detailed view of the tensioning strap in the fixed position in the receptacle;

FIG. 8 shows, in three part-FIGS. *8a*, *8b* and *8c* detailed views of a section through guides of the receptacle.

Figure 1:
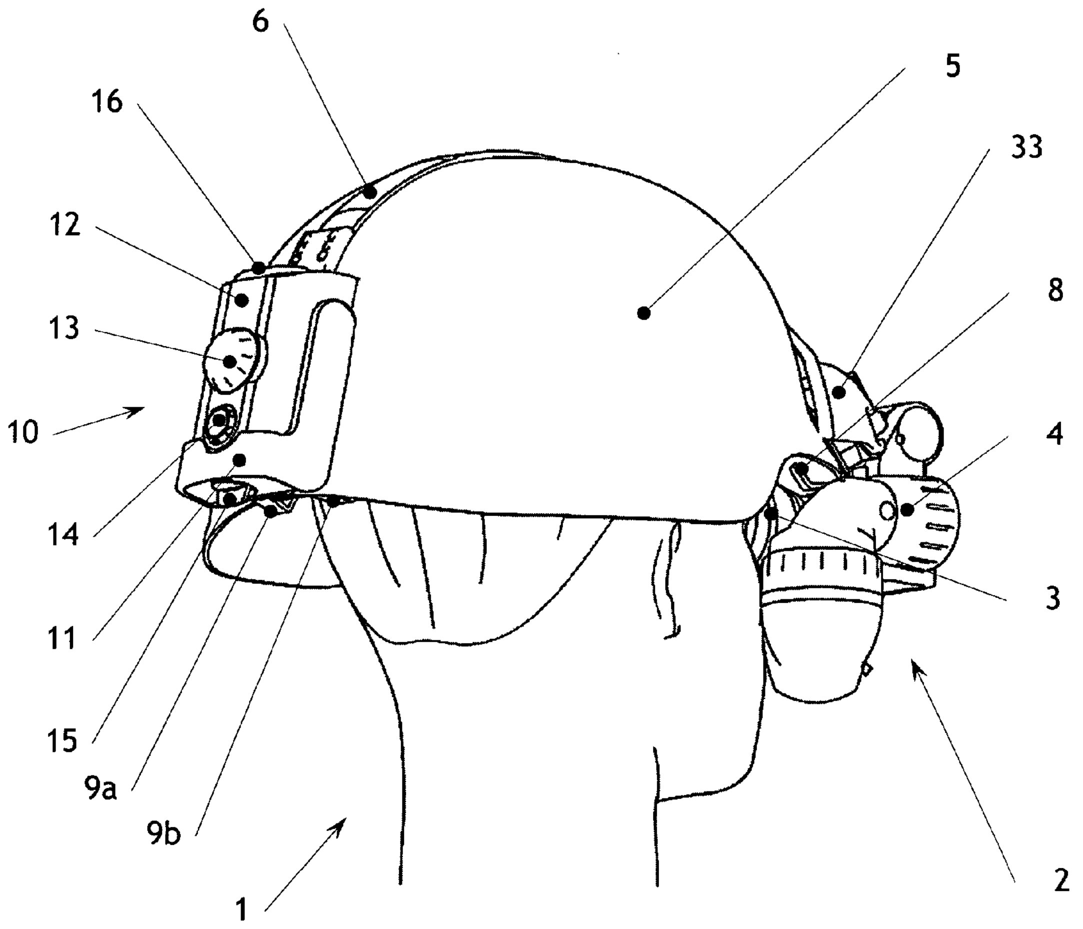

FIG. 1 shows a receptacle according to the invention for attachments for a sighting device on a helmet 5 as a head covering of a user 1. Here, the sighting device is a monocular night vision device 2 and is positioned in the working position with the eyepiece 3 in front of the eye of the user 1. Radiation received through the objective 4 is amplified in a low light level amplifier of the night vision device 2 and perceived as an amplified image by the observer 1. The fixing of the night vision device 2 on the head covering is effected by means of a holder 33, which is suspended on the edge of the front of the helmet by means of retaining bracket 8 and is connected to the attachment receptacle 10 via a tensioning strap 6.

The attachment receptacle 10 has a housing 12 in which the attachments are arranged. Controls, such as an image brightness controller 13 and a switch 16 or an electrical connection 14 are integrated in the housing 12 so that they are accessible from the outside. A battery compartment in the housing 12 is accessible via a battery cover lock 15.

The attachment receptacle 10 is connected to a fixing component which is suspended by means of retaining brackets 9*a* on the edge of the back of the helmet. For fixing on the helmet 5, the attachment receptacle 10 is fixed by the connection to the fixing component on the helmet 5. The tensioning strap 6 is led through an opening in the housing into the attachment receptacle 10. If the tensioning strap 6 is pushed as far as possible into the attachment receptacle 10, it is fixed by means of a clamping device of the attachment receptacle 10 so that the attachment receptacle 10 rests firmly against the helmet 5. In the diagram of FIG. 1, a clamping lever 11 is shown as an adjusting element of the clamping device.

Figure 2:
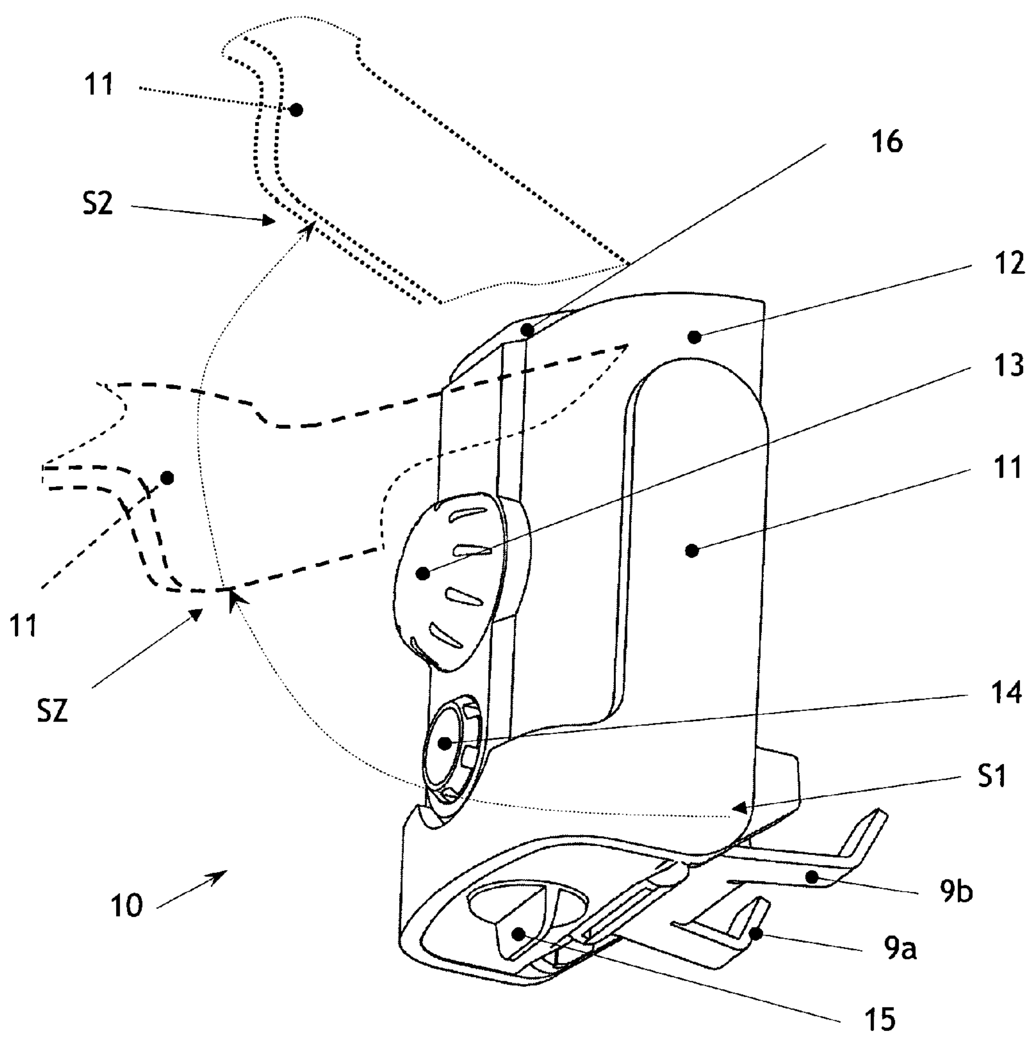

FIG. 2 shows the attachment receptacle 10 from FIG. 1 and various positions of the clamping lever 11 for explaining the mode of operation thereof. The clamping lever 11 is mounted on the housing 12 and is integrated in this form in such a way that it rests closely against the housing 12 and hence no substantially protruding edges can cause accidental actuation. The positions of the clamping lever 11 during actuation thereof are shown. In a first position S1, the clamping lever 11 rests directly against the housing 12; in this position, the tensioning strap 6 from FIG. 1 is fixed and the attachment receptacle 10 is fixed on the helmet 5. Advantageously, the clamping lever 11 is snapped in on the housing 12 in the first position S1 so that accidental actuation becomes even more difficult. If the clamping lever 11 is actuated—in this case by a rotational or pivot movement—the tensioning strap 6 from FIG. 1 can be pushed into the attachment receptacle 10 in an intermediate position SZ and is secured there to prevent it from being pulled out. The clamping lever 11 is shown in the intermediate position SZ as a part indicated by dashes. In a second position S2 of the clamping lever 11—shown as a part indicated by dots in the second position S2—the tensioning strap 6 from FIG. 1 is released and, for removal of the attachment receptacle 10 can be pulled several centimeters—or optionally completely—out of said receptacle.

FIG. 2 also shows the electrical connection 14 which serves, for example, for supplying the night vision device 2 with information data from other sources, such as, for example, from radio transmission, data stores or measuring devices, the image brightness controller 13, which is provided, for example, for regulating the power of the low light level amplifier or for a display in the night vision device 2, and the switch 16, which can be formed for switching the low light level amplifier or other signals such as, video signals, on and off. The battery cover lock 15 of the battery compartment and the retaining brackets 9*a*, 9*b* of the fixing component are also shown.

Figure 3A:
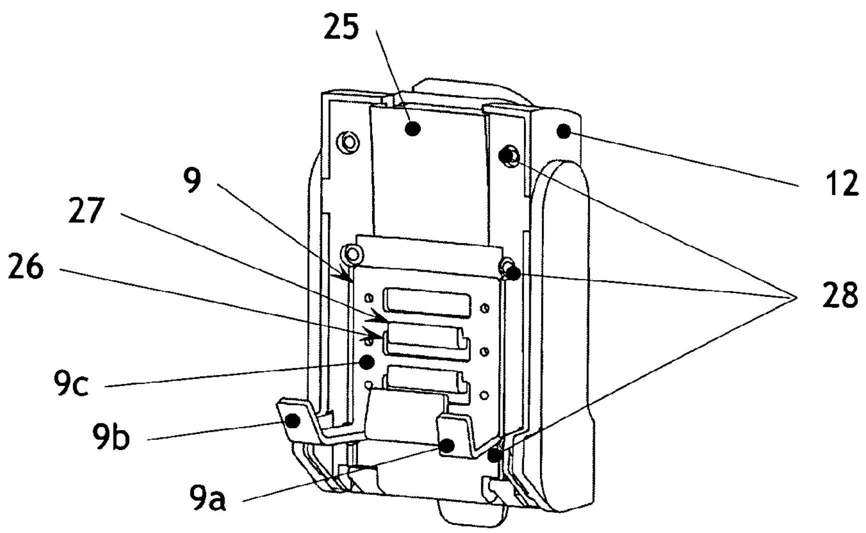
Figure 3B:
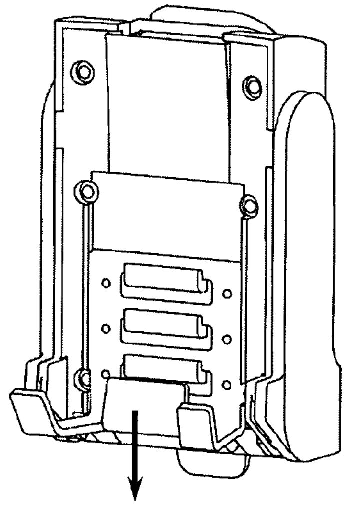
Figure 3C:
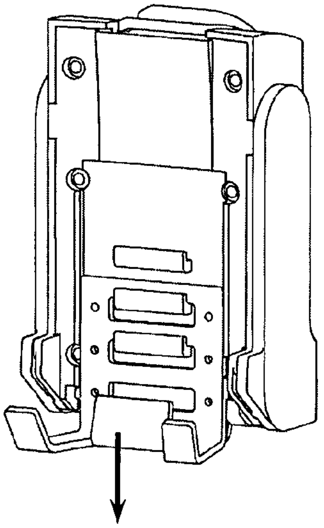

FIGS. 3*a* to 3*c* show the fixing component and the connection thereof to the attachment receptacle 10. The fixing component 9 is in the form of support plate 9*c* with retaining brackets 9*a*, 9*b*. Furthermore, it has slot elements 26 as positioning elements. The connection to the attachment receptacle is effected via a connecting element 25 which in this case forms a back panel of the housing 12, the connecting element 25 in the form of a back panel of the housing being connected to further housing parts via a screw connection 28. The connecting element 25 has a plurality of hook elements 27 as positioning elements. By hooking in and clicking in or locking in various hook positions, a coarse adjustment for different sizes of a head covering is possible. FIG. 3*a* shows a relative position of fixing component 9 and connecting element 25 for head coverings for small head sizes, FIG. 3*b* shows a relative position for head coverings for “medium” head sizes and FIG. 3*c* shows a relative position for head coverings for large head sizes. In the embodiment shown, three hook and slot elements (27, 26) are provided in each case. Of course, the number and form of the positioning elements can be chosen alternatively to suit the purpose.

Figure 4:
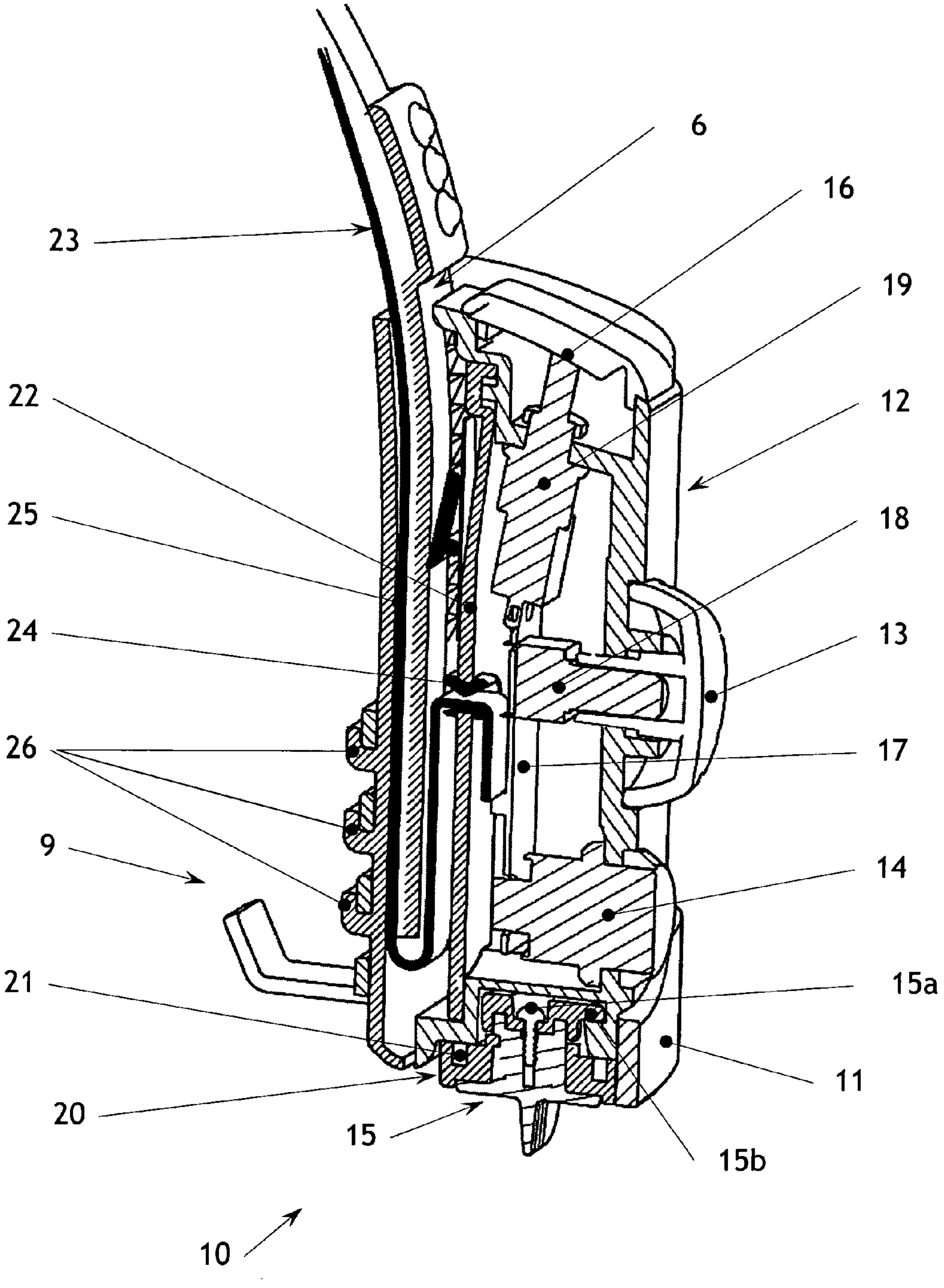
FIG. 4 shows a sectional view of the receptacle longitudinally through the middle thereof.

FIG. 4 shows a section through the attachment receptacle 10, so that the installation position of the tensioning strap 6, which is present in a height-displaceable manner between the connecting element 25 as the back panel of the housing and the further housing parts of the housing 12, is particularly clearly visible. In this diagram, the tensioning strap 6 is shown in a lower position—i.e. pushed as far as possible into the attachment receptacle 10. The switch 16, a push button 19, a potentiometer 18, the image brightness controller 13, the electrical connection 14 and an electronics unit 17 are shown here as attachments, the switch 16—made, for example, of rubber-like material—acting on the push button 19 and the image brightness controller 13 being connected to the potentiometer 18. The push button 19, potentiometer 18 and electrical connection 14 are electrically connected to the electronics unit 17, such as a circuit board. Further mechanical components, for example for arranging or fixing for the controls, are not described. A cable 23 by means of which the electronics unit 17 can be electrically and electronically connected to the night vision device 2 from FIG. 1 is connected to the electronics unit 17. The cable 23 is led in the attachment receptacle 10 through a cable bush 24 through an electronics cover 22, which is inserted into the attachment receptacle 10 for water-tight separation between the tensioning strap 6 and the electrical and electronic attachments. The cable 23 is furthermore led in the attachment receptacle 10 in a loop around the tensioning straps 6 so that the tensioning strap 6 can easily be pulled out without damaging or bending the cable 23. The cable 23 runs further along the tensioning strap 6 and is thus completely covered and protected by the tensioning strap 6 in the region of the head covering to prevent any risk of damage. Here, both the power supply and a plurality of possible data lines are housed in the cable 23 shown by way of example as a flat cable. Batteries 34 (cf. FIG. 5) as an energy source can be inserted into the battery compartment of the attachment receptacle 10 or removed therefrom. For opening and closing the battery compartment, a battery compartment cover 20 rests against the housing 12 via a seal 21. By means of a rotatable battery cover lock 15 which is non-rotatably connected to a locking device 15*b* by means of a screw 15*a*, the battery compartment cover 20 is held by means of an undercut in the housing 12 or released for opening, depending on the rotational position of the battery cover lock 15.

Figure 5:
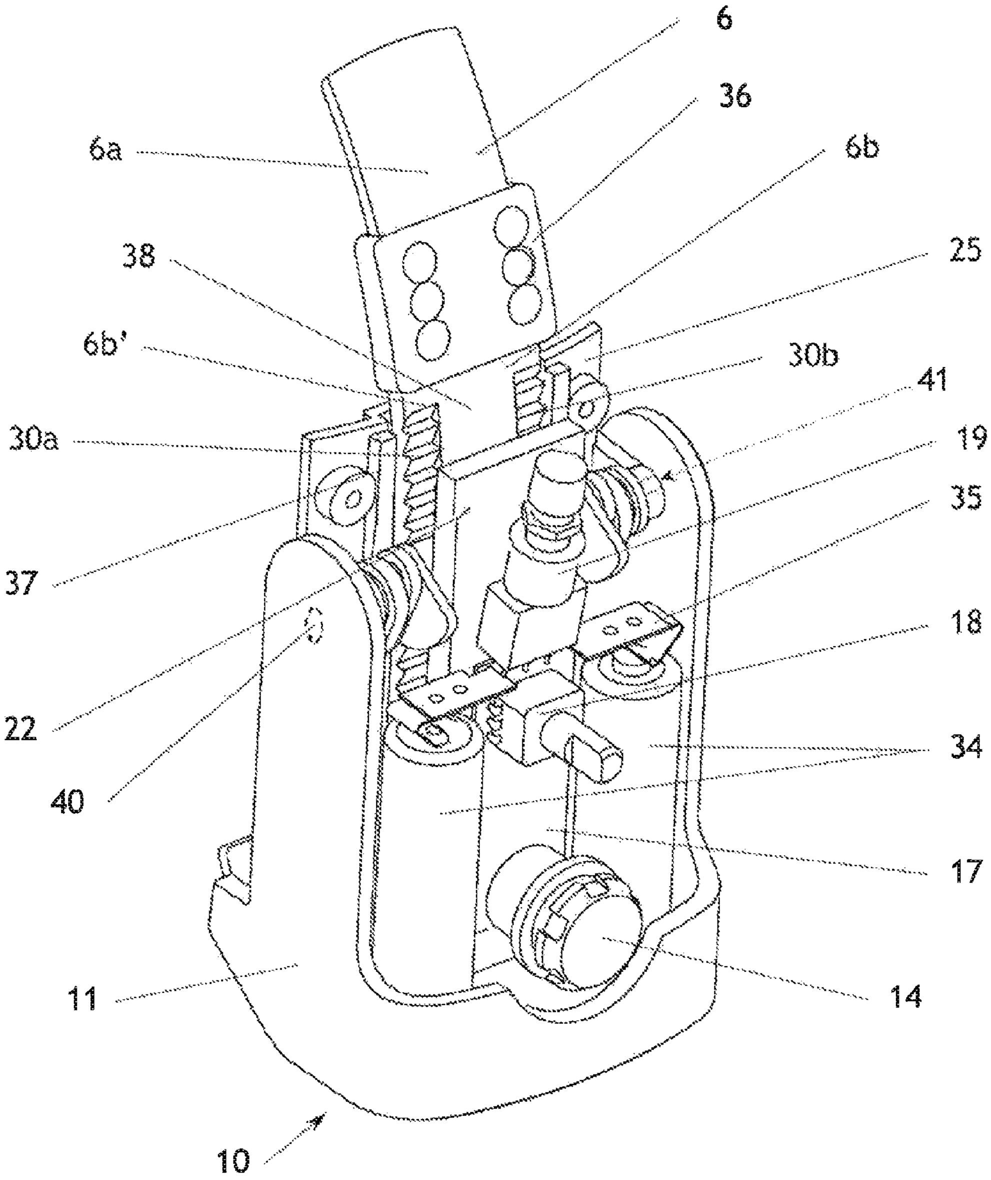
FIG. 5 shows the receptacle according to the invention, comprising a tension strap connected to the receptacle, and attachments.

In FIG. 5, the tensioning strap 6 and its arrangement or guidance in the attachment receptacle 10 are shown in more detail. In order to show the tensioning strap 6 in the receptacle, housing parts have been removed in FIG. 5. The tensioning strap 6 is composed of a first tensioning strap part 6*a* and a second tensioning strap part 6*b*. The first tensioning strap part 6*a* is guided over the head covering, such as the helmet 5 (cf. FIG. 1), in the position of use and is made, for example, of textile fabric or a hose-like rubber-like material. Here, the second tensioning strap part 6*b* is made of plastic and has a cable duct 38 in the middle for the cable 23 from FIG. 4, which substantially encloses the cable 23. The cable 23 can advantageously be led up to the sighting device in the tensioning strap 6 (in a cable duct both in the first and in the second tensioning strap part 6*a*, 6*b*), for example in a cable duct represented by an opening through the tensioning strap 6 or a covering—for example of plastic—located in the tensioning strap 6. The guidance may also be effected within the second tensioning strap part 6*b* and below the first tensioning strap part 6*a*. The second tensioning strap part 6*b* has locking elements, in each case in the form of a tooth system 30*a*, 30*b*, to the right and left of the cable duct 38, along a clamping region 6*b*'. The clamping region 6*b*' defines the region of the tensioning strap 6—or of the second tensioning strap part 6*b* here—which can be pushed completely into the attachment receptacle 10. The two tensioning strap parts are connected via a flange-like connecting part 36 which can be provided on the first or second tensioning strap parts 6*a*, 6*b*. The connection of the two materials of the two tensioning strap parts can be effected by means of rivets or screws. Of course, an alternative customary method of connection can equally be chosen.

FIG. 5 also indicates the guidance of the tensioning strap 6 in the attachment receptacle 10. The latter has, to the right and left along the connecting element 25, guides 37 by means of which the tensioning strap 6 is exactly laterally guided. Also shown are attachments of the attachment receptacle 10, as arranged in the position of use. The components push button 19, potentiometer 18 and electrical connection 14 mounted on the electronics unit 17 are centrally arranged. Arranged on the outsides are batteries 34 which are connected via springy battery contacts 35 to the electronics unit 17. The interconnection of the other two battery contacts is housed in a conventional manner in the battery cover and not shown here. The electronics cover 22 is arranged between the tensioning strap 6 and the electrical and electronic attachments.

Figure 6:
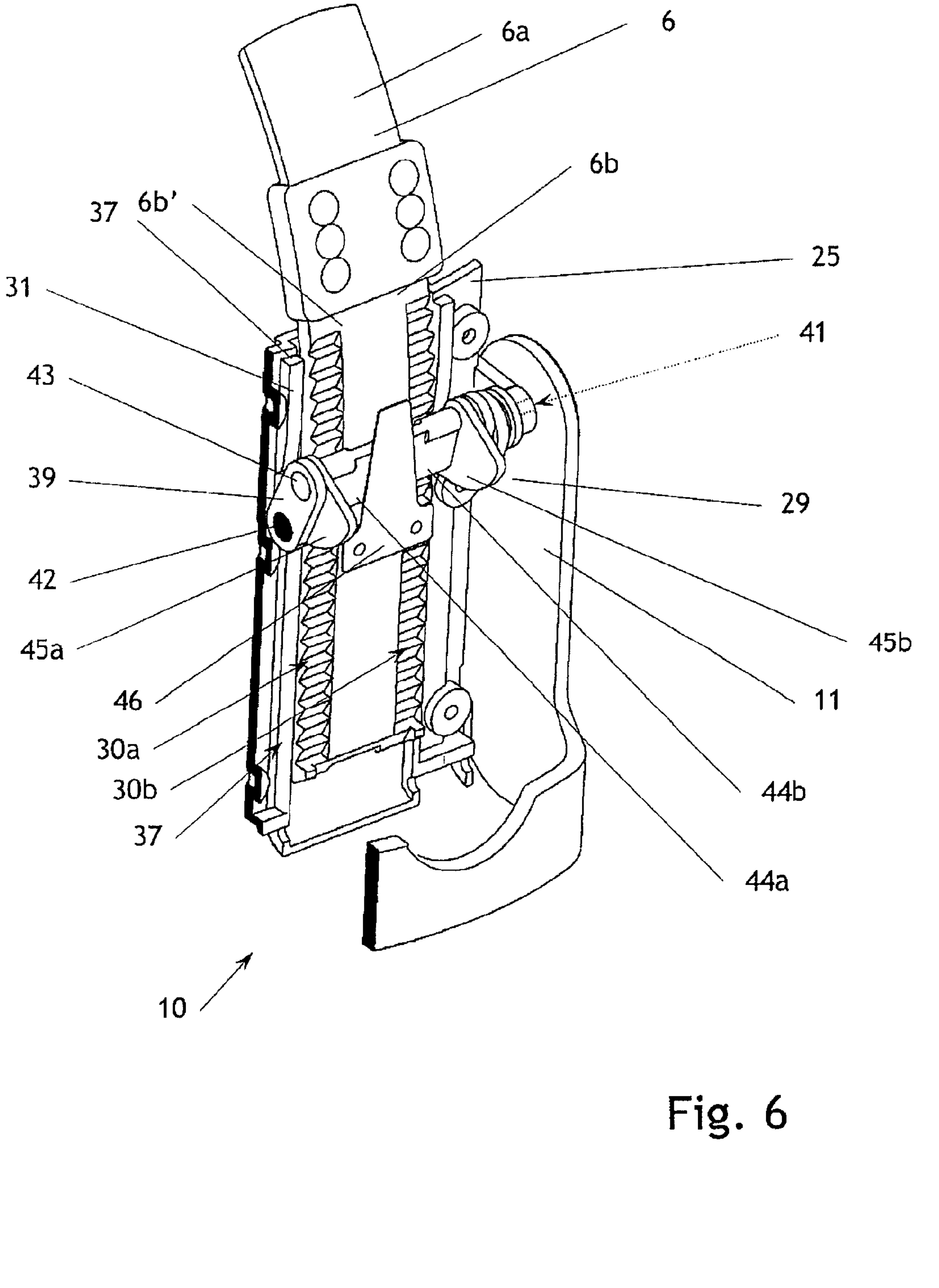
FIG. 6 shows the view from FIG. 5 with components removed.

For visualization of the clamping device of the attachment receptacle 10, several elements have been removed in FIG. 6. The connecting component 25 with guides 37 and the tensioning strap 6 guided in the guides 37 are shown. The tensioning strap 6 can be pushed along the clamping region 6*b*' in the guides 37 from a starting position to an end position. The starting position can be defined as the position in which the clamping region 6*b*' is present to a minimal extent in the attachment receptacle 10, i.e. is pulled out to the maximum extent. Pulling out completely from the attachment receptacle 10 may be possible. If appropriate, however, complete pulling out can, however, also be prevented—for example by means of a stop element—so that complete separation from the tensioning strap 6 is avoided, so that the attachment receptacle 10 never hangs only by the cable 23 (cf. FIG. 4). End position is to be understood as meaning the position in which the entire clamping region 6*b*' is pushed into the attachment receptacle 10.

The clamping device comprises the adjusting element in the form of clamping lever 11. By means of the clamping lever 11, a fixing element in the form of catch 29 and belonging to the clamping device can be brought into a plurality of positions. The catch 29 has guide surfaces 45*a*, 45*b* and catch knives 44*a*, 44*b*, the catch knives 44*a*, 44*b* being formed so as to correspond to locking elements, formed as tooth systems 30*a*, 30*b*, in the clamping region 6*b*' of the second tensioning strap part 6*b*, in that they represent locking elements for the tooth systems 30*a*, 30*b*. The effect of the tooth systems 30*a*, 30*b* and of the catch knives 44*a*, 44*b* can of course equally be achieved by means of a tooth system along the clamping region 6*b*' and a catch knife—the formation of the embodiment shown, comprising in each case two tooth systems 30*a*, 30*b* and catch knives 44*a*, 44*b*, results from the design of the cable duct. Furthermore, embodiments comprising the tooth system to the right of left along the clamping region 6*b*' and corresponding locking element and, if appropriate, a corresponding cable duct to the left or the right would also be possible.

The clamping lever 11 is rotatably mounted by means of rotary bearing elements 40 in bearings 41—for example correspondingly formed recesses—of the housing back panel formed by the connecting element 25. The mounting of the clamping lever 11 could of course also be effected at another point (for example in lateral surfaces of a housing). The rotary bearing elements 40 are on the one hand firmly connected to the clamping lever 11 and on the other hand ratably connected to connecting rods 39 by means of pegs 42 eccentrically to the axis of rotation of the clamping lever 11. The catch 29 or the catch knives 44*a*, 44*b* is or are ratably mounted in the connecting rod 39 by means of axial elements 43. Thus, a rotational movement of the clamping lever 11 is converted in a known manner via the connecting rod 39 as a force transmission element into a displacement of the catch 29 and hence also of the catch knives 44*a*, 44*b*.

The displacement of the catch 29 is also controlled by means of the guide surfaces 45*a*, 45*b* thereof. The control is effected in cooperation with the guides 37 of the connecting element 25, in particular with connecting link-like guide elements 31 of the guides 37. With continuing rotation of the clamping lever 11 about the axis of rotation, the catch 29 is displaced via the connecting rod 39 owing to the eccentric arrangement of the pegs 42 relative to the axis of rotation. On rotation of the clamping lever 11 into the second position S2—as shown in FIG. 2—the guide surfaces 45 of the catch 29 are pushed on to the connecting link-like guide elements 31, with the result that the catch knives 44*a*, 44*b* are raised and complete release of the tensioning strap 6 is achieved. The mode of operation is shown in more detail in the following figures.

If the clamping Lever is moved from the second position S2 to the first position S1, the catch 29 is moved downward and the catch knives 44*a*, 44*b* engage the saw tooth-like tooth systems 30*a*, 30*b* and, on further displacement of the catch 29 by means of the clamping lever 11, push the tensioning strap 6 downward, which results in clamping of the tensioning strap 6.

In the intermediate position SZ, the catch knives 44*a*, 44*b* rest on the tooth systems so that the tensioning straps can be pushed downward, but an upward displacement—in the direction of the sighting device—is blocked by the catch knives 44*a*, 44*b*. In order to press the catch knives 44*a*, 44*b* toward the clamping region 6*b*' or the tooth systems 30*a*, 30*b*, a leaf spring 46 is also mounted in the attachment receptacle 10—for example on a housing part not shown.

Figure 7A:
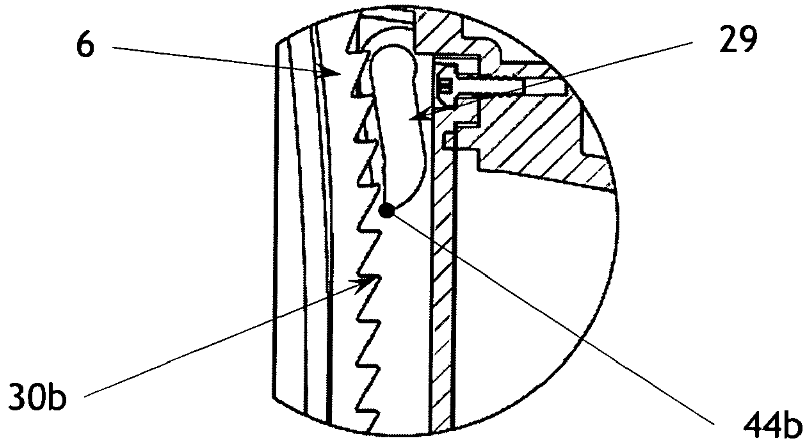
Figure 7B:
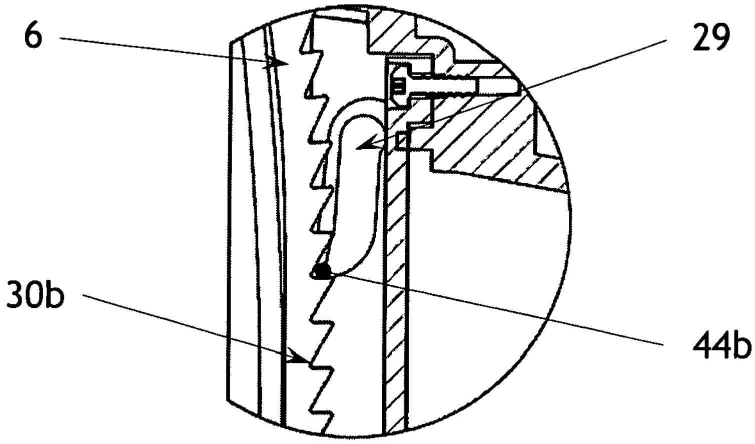

FIGS. 7*a* and 7*b* show a detailed view of the tensioning strap 6 in the attachment receptacle and the cooperation of a catch knife 44*b* of the catch 29 with a tooth system 30*b* of the tensioning strap 6. In FIG. 7*a*, the catch knife 44*b* rests on the back of the tooth of the tooth system 30*b*-which catch knife position corresponds to the intermediate position SZ of the clamping lever 11 from FIG. 2. By means of the saw tooth-like design of the tooth system 30*b*, the tensioning strap 6 can be moved downward without resistance, the catch 29 securing the tensioning strap 6 at each tooth and preventing it from being pulled out. When the clamping lever is brought to the first position S1 from FIG. 2, the catch knife 44*b* dips, according to FIG. 7*b*, into the tooth system 30*b* so that the retaining connection is produced on the head covering. By operating the clamping lever 11 from the second position P2 to the first position P1, according to the diagram in FIG. 2, catch 29 moves in the vertical direction, with the result that the tensioning strap 6 moves downward by means of catch knife 44*b* and is thus clamped.

In this way simple mounting of the attachment receptacle on the head covering is possible. In the first position S1 or the intermediate position SZ of the clamping lever 11 (according to FIG. 2), the tensioning strap 6 can be moved manually into the attachment receptacle. The movement of the lever from the first position S1 to the second position S2 results in snapping into the tooth system 30*a*, 30*b* (FIG. 6) and displacement of the catch knives 44*a*, 44*b* (FIG. 6) downward so that the tensioning strap stretched over the head covering is clamped and the attachment receptacle 10 is pressed firmly on to the head covering (cf. FIG. 1).

Figure 8A:
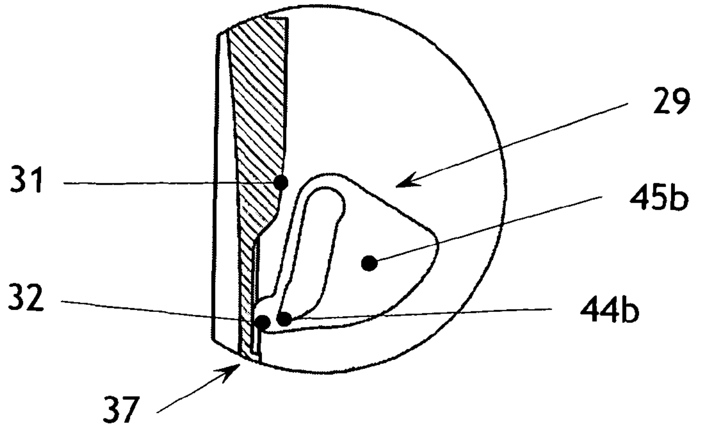
Figure 8B:
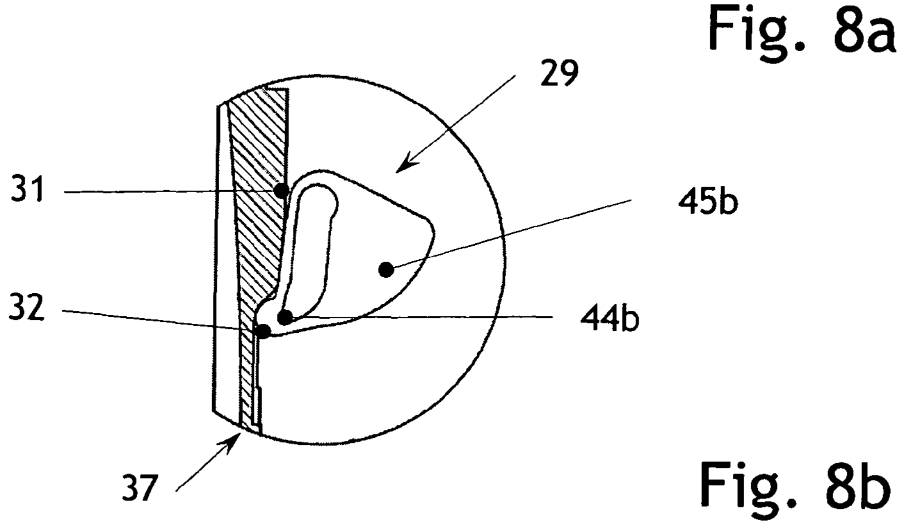
Figure 8C:
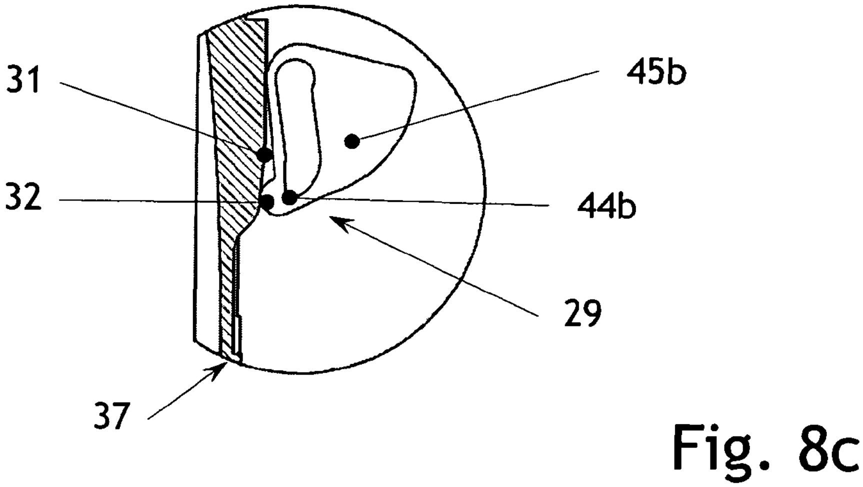

FIGS. 8*a* to 8*c* show, in section, detailed views of the positions of the catch 29 on displacement thereof in the guides 37 of the attachment receptacle. The guides comprise a connecting link-like guide element 31. The catch 29 with the catch knife 44*b* and its guide surface 45*b* is shown. The guide surface 45*b* has a cam 32*b* which, depending on the position of the clamping lever 11 (cf. FIG. 2), determines the stop position of the catch 29 (correspondingly, the guide surface 45*a* from FIG. 6 has a cam 32*a*).

FIGS. 8*a* and 8*b* show the position of the catch 29 when the clamping lever is brought to the first position S1 and the intermediate position SZ according to the diagram in FIG. 2. On adjustment of the clamping lever to the intermediate position SZ, the guide surface 45*b* in the guide 37 is moved along a region B to the connecting link-like guide element 31. In this region B, the catch knife 44*b* of the catch 29 can dip into the tooth system of the tensioning strap so that the catch 29 secures the tensioning strap in any position to prevent it from being pulled out.

FIG. 8*c* shows the catch 29 in the second position S2 of the clamping lever according to the diagram in FIG. 2. If the clamping lever is moved to the second position S2 the guide surface 45*b* is pushed on to the connecting link-like guide element 31. The catch 29 is inevitably rotated by the cam 32—in the counterclockwise direction in the diagram—so that the catch knife 44*b* can no longer dip into the tooth system of the tensioning strap. As a result, the retention of the tensioning strap by the catch knife 44*b* is suppressed in this position, with the result that the tensioning strap can be pulled out so that the attachment receptacle can be removed from the head covering.

The invention claimed is:

1. An attachment housing (10) for attaching an ancillary electrical component to a sighting device; the sighting device being fixable on a front side of a head covering, the housing including:

the attachment housing (10) securable on a back side of the head covering, which is substantially opposite the first side, by a fixing component (9);

a tensioning strap (6) extendable over the head covering;

a clamping lever rotatably mounted on the attachment housing that tightens the tensioning strap (6) extended over the head covering;

a clamping fixture for producing a retaining connection via the tensioning strap (6) at a front end to at least one of the front side and the sighting device, wherein a second end of the tensioning strap (6) is anchored in the clamping fixture and insertable into the attachment housing (10) and a cable (23) enclosed in the tensioning strap (6), the cable (23) is adjustable in the attachment housing (10) in a loop around the tensioning strap (6) so that the tensioning strap (6) can easily be pulled out on displacement of the tension strap (6) without damaging the cable (23).

* * * * *